United States Patent [19]

Eschborn, II et al.

[11] Patent Number: 5,076,850
[45] Date of Patent: Dec. 31, 1991

[54] PROCESS FOR TREATING METAL CHLORIDES

[75] Inventors: Ralph J. Eschborn, II, Chadds Ford, Pa.; Peter Hill, Woodstown, N.J.

[73] Assignee: E. I. Du Pont de Nemours and Company, Wilmington, Del.

[21] Appl. No.: 668,797

[22] Filed: Mar. 7, 1991

Related U.S. Application Data

[63] Continuation of Ser. No. 425,402, Oct. 23, 1989, abandoned.

[51] Int. Cl.$^5$ .............................................. C04B 7/02
[52] U.S. Cl. .................................... 106/606; 106/734; 106/287.35
[58] Field of Search ............................... 106/606, 734

[56] References Cited

U.S. PATENT DOCUMENTS

| | | | |
|---|---|---|---|
| 4,084,981 | 4/1978 | Higuchi et al. | 106/96 |
| 4,124,405 | 11/1978 | Quienot | 106/111 |
| 4,229,399 | 10/1980 | Cole et al. | 264/117 |
| 4,375,986 | 3/1983 | Pichat | 106/85 |
| 4,687,373 | 8/1987 | Falk et al. | 405/128 |

Primary Examiner—William R. Dixon, Jr.
Assistant Examiner—Chris Gallo
Attorney, Agent, or Firm—Robert B. Stevenson

[57] ABSTRACT

Process for making aggregate suitable for use as a road base material comprising:
 (a) mixing metal chlorides with alkaline substance selected from the group consisting essentially of at least one cementitious material and optionally about 0.1-50%, based on the total weight of the alkaline substance, of at least one neutralizing agent, said mixing taking place in the presence of water in the amount of about 70-200 percent, based on the total weight of the alkaline substance,
 (b) partially curing the product resulting from step (a), and
 (c) agitating the product resulting from step (b) until aggregate is formed.

13 Claims, No Drawings

PROCESS FOR TREATING METAL CHLORIDES

This application is a continuation of application Ser. No. 07/425,402 filed 10-23-89 abandoned.

BACKGROUND OF THE INVENTION

This invention relates to an improved process for treating metal chlorides and especially such metal chlorides arising as byproducts from the chloride process for making $TiO_2$.

Large amounts of metal chlorides arise as byproducts from various industrial processes. For example, in the chloride process for making $TiO_2$, titanium bearing material or ore is chlorinated to produce $TiCl_4$ and other metal chloride byproducts. Subsequently, the $TiCl_4$ is separated from the byproducts and is oxidized to the desired $TiO_2$. The metal chloride byproducts are highly acidic and often contain iron chlorides as the major ingredient. While some of the byproducts can be used as a flocculant to treat waste water, large amounts must be disposed of by neutralization, land filling, deep-welling, etc.

Many processes have been proposed to neutralize and/or stabilize metal chloride byproducts. However, such processes appear to be deficient because they are both expensive and produce a product which still must be disposed of by landfill or other means.

The following information is provided which may be of interest in regard to this invention:

U.S. Pat. No. 4,229,399 discloses a process wherein solid mixtures of certain metal chlorides are mixed with certain alkaline substances followed by the addition of water. It is stated that the resulting product is substantially insoluble in water.

U.S. Pat. No. 4,375,986 discloses a process for neutralizing acidic waste material consisting of mixing the waste material with fly ash, neutralizing the resulting mixture with lime or other calcium containing materials, and adding a calcium containing binder such as lime or portland cement.

SUMMARY OF THE INVENTION

In accordance with this invention there is provided:

Process for making aggregate suitable for use as a road base material comprising:

(a) mixing metal chlorides with alkaline substance selected from the group consisting essentially of at least one cementitious material and optionally 0.1–50%, based on the total weight of the alkaline substance, of at least one neutralizing agent, said mixing taking place in the presence of water in the amount of about 70–250 percent, based on the total weight of the alkaline substance, (b) partially curing the product resulting from step (a), and (c) agitating the product resulting from step (b) until aggregate is formed.

It has been found that the process of this invention neutralizes and stabilizes metal chlorides so that they are resistant to leaching by water and are resistant to leaching as determined by current official tests of the U.S. Environmental Protection Agency and the State of California. Also, the product resulting from the process of this invention is suitable for and can be sold as high quality aggregate for road building. In contrast, the products from many prior art processes are only suitable for costly disposal in landfills.

Other advantages of the process of this invention are that the aggregate resulting therefrom (a) can exhibit greater strength than crushed rock road base, especially in layers of less than about 6–8 inches; (b) has a greater volume to weight ratio than most crushed rock and therefore will provide more road base per unit weight; and (c) can exhibit residual cementing action, i.e., when compacted, the aggregate can bind together and thus form a more cohesive mass, with good integrity.

DETAILED DESCRIPTION OF THE INVENTION:

Step (a)

In this step of the process of this invention, metal chlorides are mixed with an alkaline substance selected from the group consisting essentially of at least one cementitious material and optionally 0.1–50% of at least one neutralizing agent in the presence of water.

The metal chlorides preferably are in an aqueous solution and/or suspension. Suitable metal chlorides can be obtained as byproducts from various industrial processes. Examples include metal chloride byproducts from the manufacture of titanium dioxide by the chloride process, pickle liquor arising from the cleaning of iron, steel or other metals with hydrochloric acid, and metal chloride byproducts arising from various metal plating processes. This process is especially suitable for treating the metal chloride byproducts arising from the manufacture of titanium dioxide.

Suitable cementitious materials include hydraulic cement (including portland cement ASTM types I, IA, IP, IS, II, IIA, III, IIIA, IV, and V; aluminous cement; blast furnace slags; and mixtures thereof). Preferred are the foregoing ASTM portland cements, especially preferred are types I, IA, IP, IS, II, and IIA.

Suitable neutralizing agents include quick lime, residues from making quick lime or acetylene, lime, fly ash, soda ash, CaO, $Ca(OH)_2$, $CaCO_3$, and mixtures thereof. Generally, the neutralizing agent, if used, will be present in an amount of about 0.1–50%, preferably 0.1–25% and most preferably 0.1–10%, based on the total weight of the alkaline substance.

The use of the neutralizing agent is optional. It may be desirable to use some neutralizing agent because it often is less expensive than cementitious material. However, generally, use of the neutralizing agent can degrade the strength of the aggregate formed. Thus, the amount of neutralizing agent should be controlled so that the strength of the aggregate is within the desired range.

The water used in this step of the invention will generally be about 70–200 percent, preferably about 100–180 percent, more preferably about 130–150 percent, and most preferably about 140 percent based on the weight of alkaline substance. Note that the water can be added separately, included with the water contained in the metal chloride byproducts or both.

It has been found that lower density aggregates, with acceptable properties for road base material, are formed when a minimal amount of energy is used to carry out the mixing.

Generally, at least sufficient alkaline substance should be used to neutralize the metal chlorides and to provide the desired physical strength for the aggregate. For road base material, on a weight basis, this often will require at least about 2 parts alkaline substance per part of metal chloride.

Step (b)

In this step of the process of this invention, the product resulting from step (a) is partially cured. By "partially cured" it is meant that such product is allowed to cure for a sufficient time so that it is resistant to slump and flow, but it is not in a hardened mass which would be difficult to break into aggregates. Whether or not the product has sufficiently partially cured can be easily tested by withdrawing a small sample, agitating it (such as by mixing or stirring), and observing whether suitable aggregates are formed. Another suitable test is to determine whether or not a small sample can be crumbled by hand; if so, one can proceed to step (c).

Ordinarily, the partial curing will take place in about 4–24 hours. It generally is preferable during this step to shape the product resulting from step (a) into a compact mass to minimize evaporation of water. A suitable method for carrying out this step of the process is to deposit the product resulting from step (a) into a concrete holding basin or a vessel. Also, to minimize evaporation of water, the product being processed in this step of the invention can be covered. An alternative method for carrying out this step is to deposit the material onto a concrete pad or other suitable laydown area and optionally covering it with a waterproof membrane (such as a plastic sheet or tarpaulin).

Step (c)

In this step of the process of this invention, the product resulting from step (b) is agitated until aggregate is formed. Suitable methods for carrying out the agitation include: spreading and/or piling the material, mixing, shaking, vibrating, and combinations thereof. The concept involved in this step of the invention is that while curing continues to take place, the material is agitated so that aggregates are formed, rather than a hard, solid, compacted mass. Of course, to conserve energy, it is desirable to use the minimum amount of agitation necessary to produce the aggregates. For road base material, preferable aggregates often will have the consistency of fine sand, having agglomerates thereof dispersed throughout the sand. The agitation can be carried out continuously or intermittently. Intermittent agitation is preferred.

FINISHING OPERATIONS

After the aggregates are formed, it ordinarily is desirable to allow final curing to take place so that the aggregate has the desired amount of strength and integrity. This final curing ordinarily will be sufficiently complete within 1–4 weeks.

After the final curing, if desired, the aggregate can be subjected to screening, crushing, and moisture adjustment.

The aggregates made by the process of this invention can be used as base material for road building or in engineered fills where a quality structural material is desired.

EXAMPLE

The following example illustrates the operation of this invention. Unless otherwise indicated, all percentages are on a weight basis.

Metal chloride solution in the amount of 6000 pounds was placed in a rotary drum turning at 6 revolutions per minute. The metal chloride solution was a byproduct from a chloride process for producing $TiO_2$ pigment and had the following composition:

| Ingredient | Percent |
| --- | --- |
| $FeCl_3$ | 1.2 |
| $FeCl_2$ | 8.6 |
| $TiO_2$ | 8.0 |
| Coke | 8.2 |
| $SiO_2$ | 0.8 |
| $TiOCl_2$ | 8.5 |
| $AlOCl$ | 2.6 |
| $VOCl_3$ | 0.5 |
| $MnCl_2$ | 2.0 |
| $CrCl_3$ | 0.6 |
| $MgCl_2$ | 1.0 |
| $CaCl_2$ | 0.1 |
| HCl | 1.2 |
| $Cl^-$ (arising from metal chlorides other than above) | 1.3 |
| Insolubles (other than above) | 0.5 |
| $H_2O$ | 55.0 |
| Total | 100.0 |

While mixing was continued, 5000 pounds of water and 6000 pounds of ASTM Type-I portland cement were added.

The resulting material was then discharged to a concrete basin and shaped to minimize the surface area. After 12 hours, the material was removed from the basin with a front end loader and then spread out and piled. Subsequently, the material was spread out and repiled after 12 and 24 hours.

Afterwards, the material was allowed to cure for a week and subjected to screening, crushing, and moisture adjustment to produce a finished product.

The invention claimed is:

1. Process for making aggregate suitable for use as a road base material comprising:
   (a) mixing metal chlorides with alkaline substance selected from the group consisting essentially of at least one cementitious material and optionally about 0.1–50%, based on the total weight of the alkaline substance, of at least one neutralizing agent, said mixing taking place in the presence of water in the amount of about 70–200 percent, based on the total weight of the alkaline substance,
   (b) partially curing the product resulting from step (a),
   (c) agitating the product resulting from step (b) until aggregate is formed and
   (d) curing the product of step (c) until aggregate of the desired strength and integrity is formed.
2. The process of claim 1 wherein the alkaline substance is portland cement and the neutralizing agent is lime.
3. The process of claim 1 wherein the water is present in an amount of about 100–180 percent.
4. The process of claim 1 wherein the water is present in an amount of about 130–150 percent.
5. The process of claim 1 wherein the water is present in an amount of about 140 percent.
6. The process of claim 1 wherein the partial curing in step (b) is carried out for about 4–24 hours.
7. The process of claim 1 wherein the agitation in step (c) is carried out for at least about 12 hours.
8. The process of claim 1 wherein the agitation of step (c) is carried out for about 12–72 hours.

9. The process of claim 1 wherein the alkaline substance is portland cement, the neutralizing agent is lime, and the water is present in an amount of about 100–180 percent.

10. The process of claim 1 wherein the alkaline substance is portland cement, the neutralizing agent is lime, the water is present in an amount of about 100–180 percent, the partial curing in step (b) takes place for about 4–24 hours, and the agitation in step (c) takes place for about at least 12 hours.

11. The process of claim 11 wherein the water is present in an amount of about 130–150 percent.

12. The process of any one of the preceding claims 1–11 wherein the metal chlorides are in aqueous form from a chloride process for making $TiO_2$.

13. Aggregate resulting from the process of any one of claims 1–11.

* * * * *